US007486935B2

(12) United States Patent
Akahori

(10) Patent No.: US 7,486,935 B2
(45) Date of Patent: Feb. 3, 2009

(54) METHOD AND SYSTEM FOR CONTROLLING TRANSMISSION POWER

(75) Inventor: Hiroji Akahori, Minato-ku (JP)

(73) Assignee: Oki Semiconductor Co., Ltd. (JP)

( * ) Notice: Subject to any disclaimer, the term of this patent is extended or adjusted under 35 U.S.C. 154(b) by 539 days.

(21) Appl. No.: 10/795,416

(22) Filed: Mar. 9, 2004

(65) Prior Publication Data

US 2004/0253929 A1 Dec. 16, 2004

(30) Foreign Application Priority Data

Jun. 16, 2003 (JP) ............................. 2003-170397

(51) Int. Cl.
*H04B 1/00* (2006.01)
*H04B 7/00* (2006.01)
*H04B 7/185* (2006.01)
*H04Q 7/20* (2006.01)

(52) U.S. Cl. .......................... 455/68; 455/69; 455/522; 370/318

(58) Field of Classification Search .................. 455/12, 455/13, 68, 69, 517, 522; 370/17, 318
See application file for complete search history.

(56) References Cited

U.S. PATENT DOCUMENTS

| | | | | |
|---|---|---|---|---|
| 4,613,990 A | * | 9/1986 | Halpern | 455/522 |
| 5,537,443 A | * | 7/1996 | Yoshino et al. | 375/340 |
| 5,732,334 A | * | 3/1998 | Miyake | 455/126 |
| 6,144,860 A | * | 11/2000 | Komatsu | 455/522 |
| 6,385,183 B1 | * | 5/2002 | Takeo | 370/335 |
| 6,603,797 B1 | * | 8/2003 | Zeira et al. | 375/130 |
| 2002/0159514 A1 | * | 10/2002 | Miyoshi et al. | 375/226 |
| 2003/0040272 A1 | * | 2/2003 | Lelievre et al. | 455/3.06 |
| 2003/0114127 A1 | * | 6/2003 | Baldwin | 455/245.1 |
| 2004/0157633 A1 | | 8/2004 | Ogura | |

FOREIGN PATENT DOCUMENTS

| | | |
|---|---|---|
| JP | 2001-7763 | 1/2001 |
| JP | 2002-246958 | 8/2002 |
| JP | 2004-242148 | 8/2004 |

\* cited by examiner

*Primary Examiner*—Nay Maung
*Assistant Examiner*—Janelle N. Young
(74) *Attorney, Agent, or Firm*—Studebaker & Brackett PC; Donald R. Studebaker

(57) ABSTRACT

A transmission power control system includes a control and a controlled station. In the control station, an SIR (Signal-to-interference Ratio) estimator calculates two different kinds of estimated SIRs having a long and a short mean processing time, respectively. A subtractor subtracts a target SIR from the estimated SIR with the long mean processing time while an error decider compares the resulting difference with a threshold to thereby output a result of decision. A comparison value updater updates, based on the result of decision, a comparison SIR held in a comparison value holder. Another subtractor subtracts the comparison SIR from the estimated SIR with the short mean processing time. A control information converter generates power control information in accordance with the output of the another subtractor. The controlled station selectively increases or decreases transmission power in accordance with the power control information received from the control station.

1 Claim, 4 Drawing Sheets

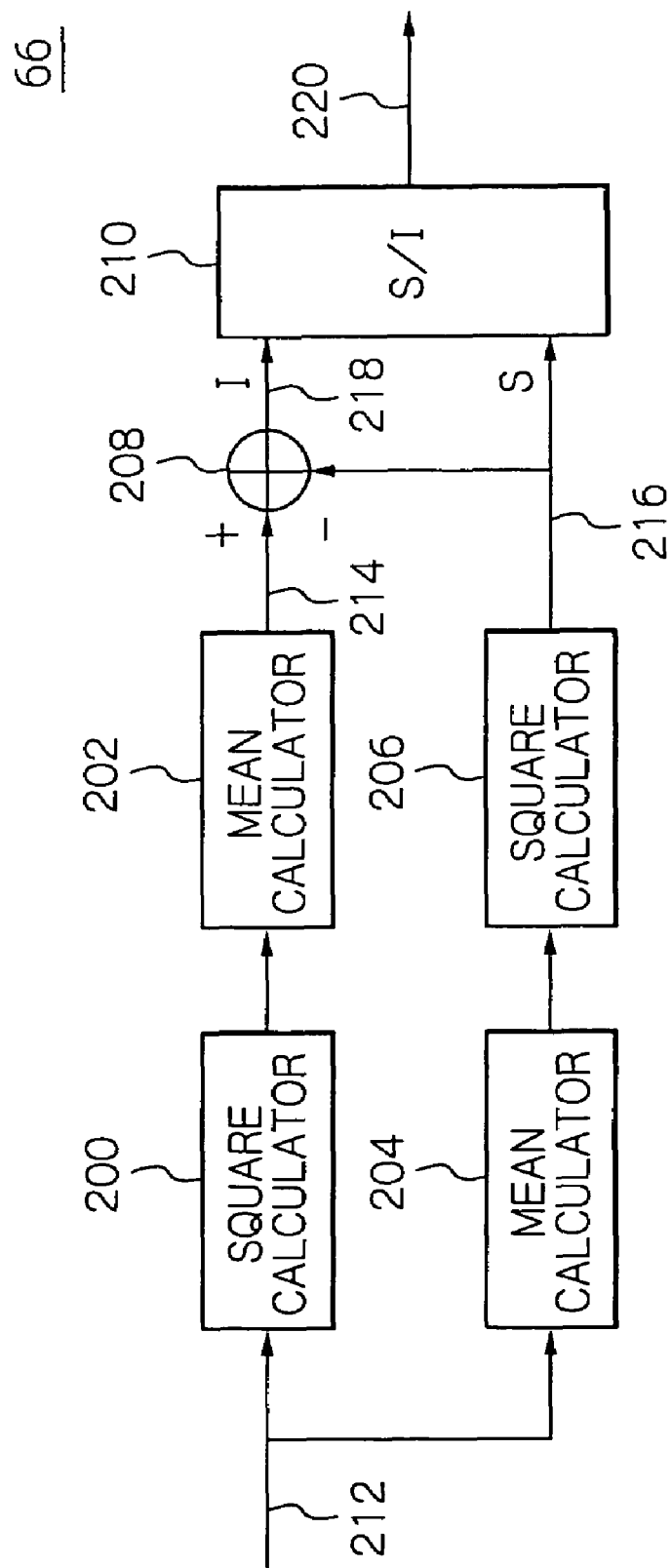

METHOD AND SYSTEM FOR CONTROLLING TRANSMISSION POWER

BACKGROUND OF THE INVENTION

1. Field of the Invention

The present invention relates to a method and a system for controlling transmission power and more particularly to a method and a system for controlling transmission power such that an SIR (Signal-to-Interference Ratio) of a received signal converges to a desired SIR.

2. Description of the Background Art

It is a common practice with a mobile communications system of the type using, e.g., a CDMA (Code Division Multiple Access) scheme to cause a base station to control, based on the SIR of a received signal, the transmission power of the individual mobile station so as to reduce interference, which is ascribable to the varying distance between the base station and the mobile station. Such a system configuration is taught in, e.g., Japanese patent laid-open publication Nos. 2001-7763 and 2002-246958 by way of example.

FIG. 3 shows a specific configuration of a conventional transmission power control system using SIR estimation. As shown, the system includes a transmission-power controlled station 3 and a transmission-power control station 4, which comprise a radio transmitter-receiver each. The transmission-power controlled station (simply controlled station hereinafter) 3 receives power control information from the transmission-power control station (simply control station hereinafter) 4 with a receiver 62 and then controls transmission power to be output from a transmitter 60 in accordance with the above information.

The control station 4 receives a signal from the controlled station 3 with a receiver 64. The control station 4 then estimates the SIR of the received signal with an SIR estimator 66, produces a difference between the SIR estimated and a target SIR, generates power control information in accordance with the difference with a control information converter 70, and then sends the power control information to the controlled station 3 via a transmitter 72. Consequently, the transmission power of the controlled station 3 is controlled such that the estimated SIR determined by the SIR estimator 66 of the control station 4 converges to the target SIR.

FIG. 4 shows a specific configuration of the SIR estimator 66. As shown, the SIR estimator 66 includes a square calculator 200 that calculates the powers of received signals 212 by squaring the individual signals 212. A mean calculator 202 produces a mean value 214 from the powers output from the square calculator 200. The mean value 214 is the mean power of the received signals 212 consisting of signal wave components and interference wave components.

On the other hand, a mean calculator 204 calculates the common-mode mean value of the received signals 212. A square calculator 206 squares the common-mode mean value output from the mean calculator 204 to thereby produce a power 216, which is the mean power S of the signal wave components of the received signals 212. A subtractor 208 subtracts the mean power 216 from the mean power 214 for thereby producing a result of calculation or difference 218. The result of calculation 218 is representative of the mean power I of the interference components. A divider (S/I) 210 divides the mean power 216 by the mean power 218 to thereby output an estimated SIR 220.

The problem with the SIR estimator 66 is that it cannot accurately estimate the SIR of the received signals 212 unless it separates only the signal wave from the signals 212. To separate the signal wave from the signals 212, it is desirable that the number of received signals 212 to be subject to common-mode mean processing be as many as possible. However, an increase in the number of received signals 212 directly translates into an increase in a period of time necessary for calculating the common-mode mean value, i.e., a mean processing time.

On the other hand, in the transmission power control system shown in FIG. 3, feedback power control is executed on the basis of the estimated SIR output from the SIR estimator 66, so that a feedback response time is determined by the mean processing time of the estimated SIR; the longer the mean processing time, the greater the delay of the feedback response time. Because the delay of the feedback response time is apt to cause transmission power sent from the controlled station 3 to oscillate, the mean processing time of the estimated SIR must be reduced to reduce the oscillation of transmission power. This, however, makes it impossible to separate only the signal wave from the received signals 212. As a result, the estimated SIR output from the SIR estimator 66 differs from the actual SIR and prevents the SIR of the received signals 212 from accurately converging to the target SIR despite the transmission power control.

SUMMARY OF THE INVENTION

It is an object of the present invention to provide a method and a system for transmission power control capable of causing the SIR of a received signal to accurately converge to a target SIR without causing transmission power to oscillate.

In accordance with the present invention, a method of controlling the transmission power of a transmission-power controlled station from a transmission-power control station begins with a step of calculating an estimated SIR having a long mean processing time and an estimated SIR having a short mean processing time on the basis of a received signal demodulated by the control station. Subsequently, an SIR comparison value, held in a comparison value holder, is updated in accordance with a difference between the estimated SIR having a long mean processing time and a desired target SIR. Thereafter, the transmission power of the controlled station is controlled such that the estimated SIR having a short mean processing time coincides with the comparison SIR.

Also, in accordance with the present invention, a transmission power control system includes a transmission-power control station and a transmission-power controlled station. The transmission-power control station includes an SIR estimator for calculating an estimated SIR having a long mean processing time and an estimated SIR having a short mean processing time in accordance with a received signal demodulated. A comparison value holder holds a comparison SIR. A subtractor subtracts a desired target SIR from the estimated SIR having a long mean processing time to thereby produce a difference. A comparison value updater subtracts the difference output from the subtractor from the comparison SIR held in the comparison value holder to thereby update the comparison SIR. A power control information generator compares the estimated SIR having a short mean processing time with comparison SIR held in the comparison value holder to thereby generate power control information that indicates lowering of transmission power if the estimated SIR is greater than the comparison SIR or indicates raising of the transmission power if the former is smaller than the latter. A transmitter transmits the power control information to the transmission-power controlled station. The controlled station includes a receiver for receiving the power control information from the control station, and a transmission power controller for controlling transmission power in accordance with the power control information fed from the receiver.

BRIEF DESCRIPTION OF THE DRAWINGS

The objects and features of the present invention will become more apparent from consideration of the following detailed description taken in conjunction with the accompanying drawings in which:

FIG. 4 is a schematic block diagram showing the configuration of an SIR estimator included in conventional transmission power control system.

DESCRIPTION OF THE PREFERRED EMBODIMENT

Figure 1:
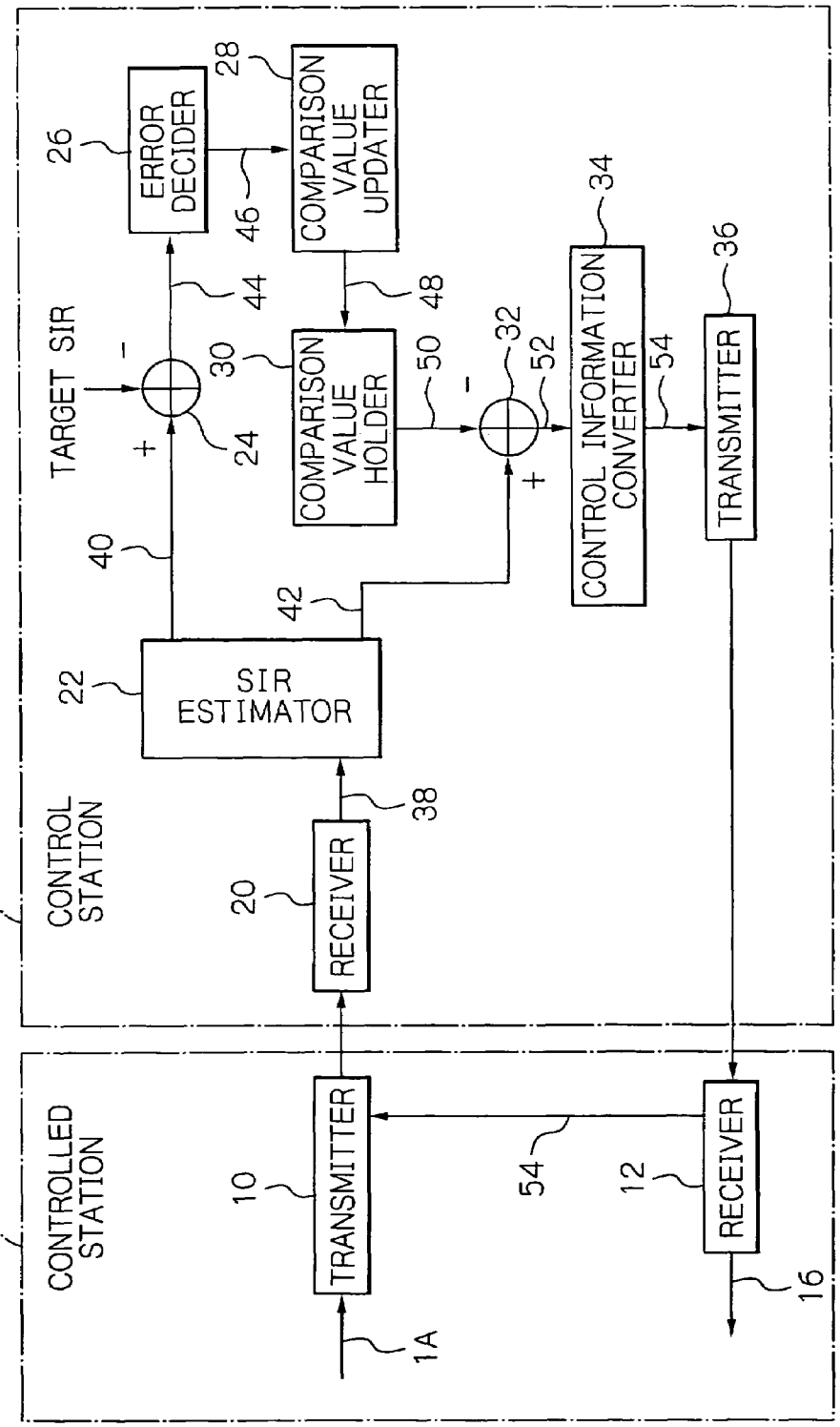
FIG. 1 is a schematic block diagram showing a preferred embodiment of the transmission power control system in accordance with the present invention.

Referring to FIG. 1 of the drawings, a transmission power control system embodying the present invention is shown. As shown, the transmission power control system includes a transmission-power controlled station 1 and a transmission-power control station 2, which will be simply referred to as a controlled station 1 and a control station 2, respectively, hereinafter. The control station 2 generates power control information 54 on the basis of an estimated SIR produced from received signals while the controlled station 1 controls its transmission power in accordance with the power control information received from the control station 2.

The controlled station 1 and control station 2 may be respectively implemented as, e.g., a mobile station and a base station included in a mobile communications system. In FIG. 1, signals are designated by reference numerals attached to signal lines on which they appear.

The controlled station 1 is a radio transmitter-receiver including a transmitter 10 and a receiver 12. The transmitter 10 generates a high-frequency signal modulated by a signal 14 to be transmitted and sends the high-frequency signal to the control station 2. In the illustrative embodiment, the transmitter 10 includes transmission power control means, not shown, for selectively increasing or decreasing transmission power stepwise with a preselected ratio in accordance with the power control information 54, which is input via the receiver 12. The receiver 12, receiving a signal sent from the control station 2, demodulates the signal to thereby output a received signal 16. In the illustrative embodiment, the receiver 12 includes power control information separating means, not shown, for separating the power control information 54 from the demodulated signal and delivering it to the transmitter 10.

The control station 2 is a radio transmitter-receiver configured to generate the power control information in accordance with the estimated SIR produced from the signal received from the controlled station 1. In the illustrative embodiment, the control station 2 calculates two different kinds of estimated SIRs 40 and 42 having a long and a short mean processing time, respectively, with an SIR estimator 22, generates the power control information 54 on the basis of the estimated SIR 42, and corrects the error of the estimated SIR 42 on the basis of the estimated SIR 40. In the illustrative embodiment, the mean processing time refers to a period of time necessary for executing mean processing that calculates the estimated SIR. The interference wave included in the SIR is assumed to contain various noises as well.

As shown in FIG. 1, the control station 2 includes a receiver 20, subtractors 24 and 32, an error decider 26, a comparison value updater 28, a comparison value holder 30, a control information converter 34 and a transmitter 36 in addition to the SIR estimator 22. The receiver 20 receives the high-frequency signal sent from the controlled station 1 and demodulates it to thereby output a received signal 38. The SIR estimator 22 is configured to calculate the two different estimated SIRs 40 and 42, as stated above.

Figure 2:
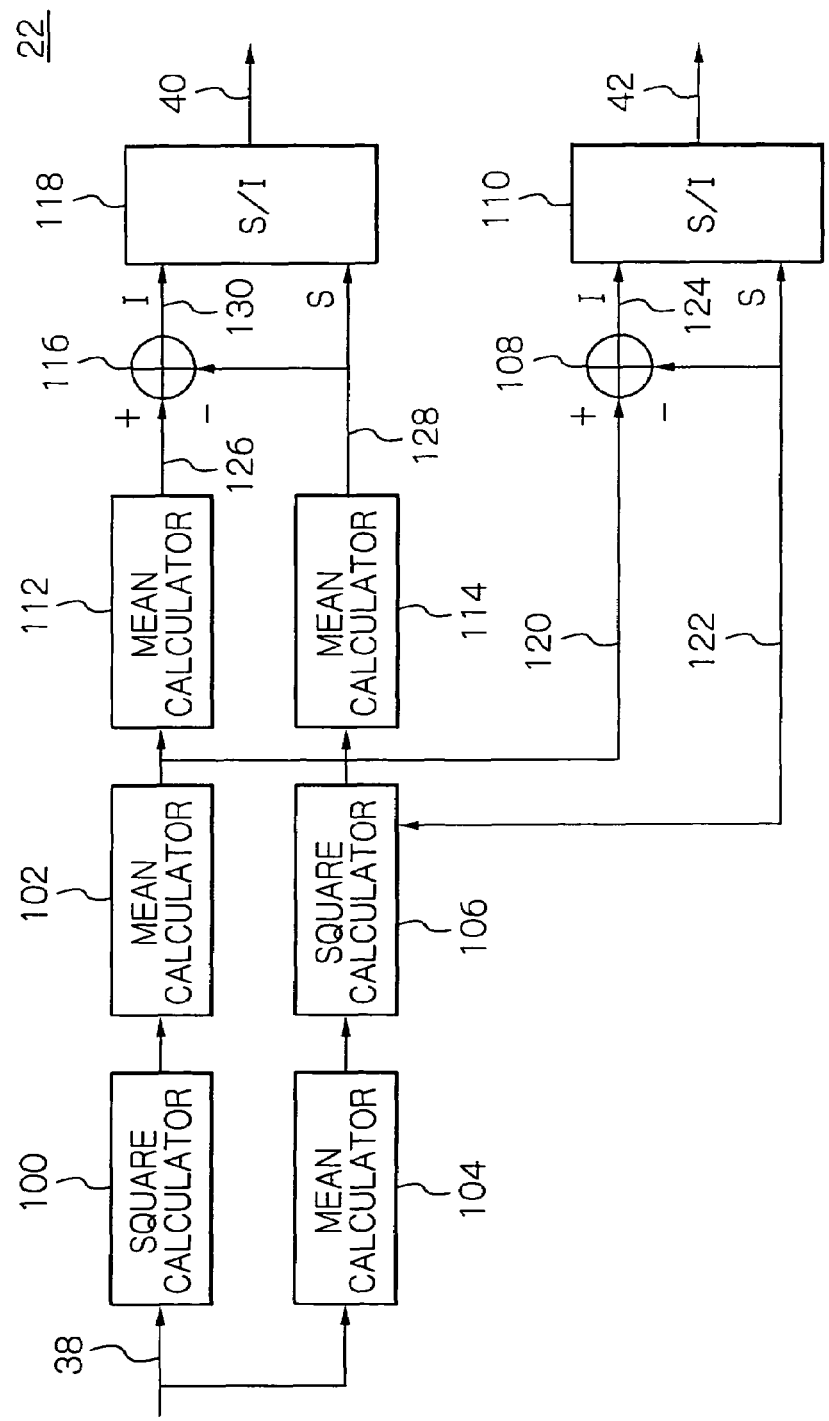
FIG. 2 is a schematic block diagram showing a specific configuration of an SIR estimator included in the illustrative embodiment.
Figure 3:
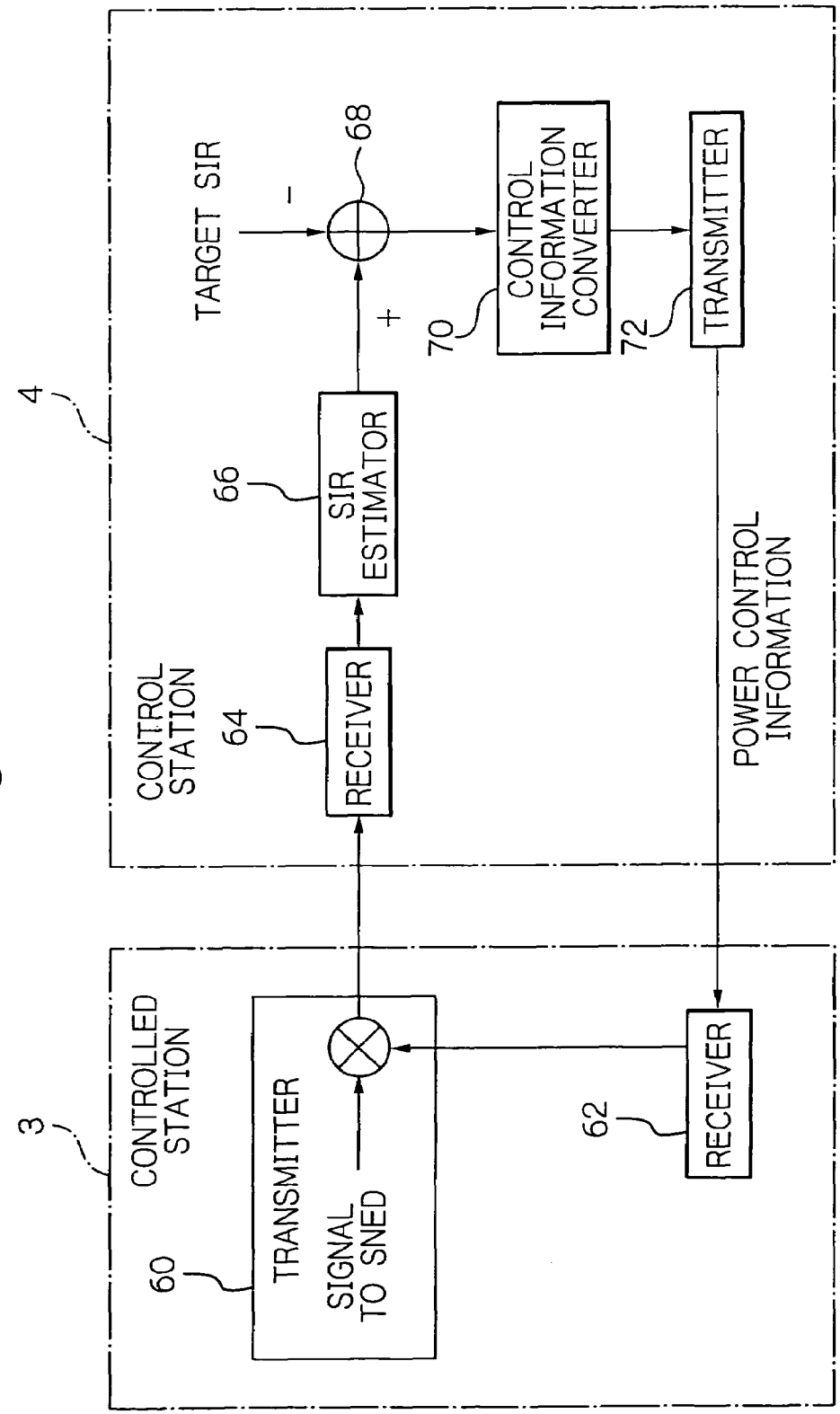
FIG. 3 is a schematic block diagram showing a conventional transmission power control system using SIR estimation.

FIG. 2 shows a specific configuration of the SIR estimator 22 included in the control station 2. As shown, the SIR estimator 22 includes square calculators 100 and 106, mean calculators 102, 104, 112 and 114, subtractors 108 and 116, and dividers (S/I) 110 and 118. In the illustrative embodiment, it is assumed that the signal demodulated by the receiver 20, FIG. 1, has frames each consisting of a plurality of slots, that each slot contains a pilot signal represented by a plurality of symbols, and that the symbols, appearing in an division T2 over which the pilot signal appears, are input to the SIR estimator 22 as received signals 38. It is to be noted that the pilot signal is only illustrative and may be replaced with any other signal suitable for the calculation of an estimated SIR. The length of the interval T2 is at least so selected as not to cause the transmission power of the controlled station 1 to oscillate.

The square calculator 100 and mean calculator 102 constitute mean power calculating means for calculating the mean power of the received signals 38. More specifically, the square calculator 102 squares the received signal 38, which appears over the interval T2, symbol by symbol to thereby output the powers of the individual symbols. The mean calculator 102 calculates the mean value of the powers thus produced by the square calculator 100 and outputs the resulting mean power 120. The mean power 120 is representative of a mean power for a single symbol included in the received signal 38, which consists of a signal wave component and an interference wave component. In the illustrative embodiment, the mean power 120 is calculated slot by slot.

The mean calculator 104 and square calculator 106 constitute mean power calculating means for calculating the mean power of the signal wave components of the received signal 38. More specifically, the mean calculator 104 produces the common-mode mean value of the received signal 38 appearing over the interval T2 to thereby separate the signal wave components from the received signal 38. The square calculator 106 squares the signal wave component output from the mean calculator 104 to thereby calculate its power and feeds the power as a mean power 122. The mean power 122 is representative of a mean power S for a single symbol included in the signal wave component and is calculated slot by slot in the illustrative embodiment.

The subtractor 108 and divider 110 constitute estimated SIR calculating means for calculating the estimated SIR 42 having a short mean processing time mentioned earlier. More specifically, the subtractor 108 subtracts the mean power 122 output from the square calculator 106 from the mean power 120 output from the mean calculator 102 to thereby calculate the mean power I of the interference wave component and outputs it as a mean power 124. The divider 110 divides the mean power 122 output from the square calculator 106 by the mean power 124 output from the subtractor 108 for thereby producing the estimated SIR 42.

The mean calculators 112 and 114 serve as mean value calculating means for calculating the mean values of the mean powers 120 and 122, respectively. More specifically, the mean calculator 112 calculates the mean value of the mean powers 120 out from the mean calculator 102 slot by slot over an interval T3 over which a plurality of slots appear, thereby outputting a mean power 126. The interval T3 is longer than the division T2 mentioned previously. Likewise, the mean calculator 114 calculates the mean value of the mean powers 122 output from the square calculator 106 slot by slot over the above interval T3 to thereby output a mean power 128. The length of the interval T3 is selected such that the estimated SIR 40 output from the divider 118 is substantially equal to the actual SIR.

The subtractor 116 and divider 118 constitute estimated SIR calculating means for calculating the other estimated SIR 40 having a long mean processing time. More specifically, the subtractor 116 subtracts the mean power 128 output from the mean calculator 114 from the mean power 126 output from the mean calculator 112 to thereby output a mean power 130 particular to the interference wave component. The divider 118 divides the mean power 128 output from the mean calculator 114 by the mean power 130 output from the subtractor 116 for thereby outputting the estimated SIR 40. The mean powers 126 and 128 are produced by averaging the mean powers 120 and 122, respectively, over the interval T3, so that the estimated SIR 40 is longer in mean processing time and therefore closer to the actual SIR than the estimated SIR 42.

Referring again to FIG. 1, the subtractor 24 subtracts the target SIR from the estimated SIR 40 output from the SIR estimator 22 to thereby output a difference 44 representative of the degree of deviation of the estimated SIR 40 from the target SIR. It is to be noted that the target SIR is determined by the system in matching relation to the kind of information to be dealt with, e.g., data or voice.

The error decider 26 determines whether or not the estimated SIR 40 has converged to the target SIR. More specifically, when the absolute value of the difference 44 output from the subtractor 24 is smaller than a preselected threshold value, the error decider 26 determines that the estimated SIR 40 has converged to the target SIR, outputting a result of decision 46 representative of zero. When the absolute value of the difference 44 is larger than the threshold value, the error decider 26 determines that the estimated SIR 40 has not converged to the target SIR yet, outputting a result of decision 46 representative of the value of the difference 44.

The comparison value holder 30 holds a comparison SIR. The comparison value updater 28 updates the comparison SIR stored in the holder 30 in accordance with the result of decision 46 output from the error decider 26. For example, the comparison value updater 28 subtracts a value represented by a result of decision 48, which is equal to the result of decision 46, from the comparison SIR stored in the holder 30, thereby updating the comparison SIR. It should be noted that a comparison SIR initially stored in the holder 30 is not limited and may be the target SIR by way of example. The subtractor 32 subtracts the comparison SIR 50 held in the holder 30 from the estimated SIR 42 output from the SIR estimator 22 and outputs the resulting difference 52.

The control information converter 34 generates, based on the difference 52 output from the subtractor 32, power control information 54 for controlling the transmission power of the controlled station 1. The power control information 54 commands the controlled station 1 to lower transmission power when the estimated SIR 42 is greater than the comparison SIR or commands it to raise transmission power if the former is smaller than the latter. The controlled station 1 selectively increases or decreases transmission power stepwise in accordance with the power control information 54, as stated earlier.

The transmitter 36 generates a high-frequency signal modulated by a signal to be transmitted and sends the high-frequency signal. In the illustrative embodiment, the transmitter 36 includes adding means, not shown, for adding the power control information 54 output from the control information converter 34 to the signal to be transmitted.

The operation of the illustrative embodiment will be described hereinafter. In the control station 2, the receiver 20 demodulates high-frequency signals received from the controlled station 1, separates received signals 38 from the signals thus demodulated, and feeds the received signals 38 to the SIR estimator 22. By using the received signals 38, the SIR estimator 22 calculates estimated SIRs 40 and 42 having a long and a short mean processing time, respectively.

More specifically, in the configuration shown in FIG. 2, the square calculator 100 and mean calculator 102 calculate the mean powers 120 of the signals 38 input over the interval T2. Likewise, the mean calculator 104 and square calculator 106 calculate the mean powers 122 of the signal wave components of the signals 38 input over the interval T2. Further, the mean calculator 112 calculates the mean power 126 of the mean powers 120 output from the mean calculator 102 and appeared over the interval T3. The mean calculator 114 calculates the mean power 128 of the mean powers 122 output from the square calculator 106 and appeared over the interval T3.

The subtractor 108 subtracts the mean power 122 from the mean power 120 to thereby produce the mean power 124 of the interference wave components. Subsequently, the divider 110 divides the mean power 122 by the mean power 124 for thereby calculating an estimated SIR 42 having a short mean processing time. Likewise, the subtractor 116 subtracts the mean power 128 from the mean power 126 to thereby produce the mean power 130 of the interference wave components. Subsequently, the divider 118 divides the mean power 128 by the mean power 130 for thereby calculating an estimated SIR 40 having a long mean processing time. The estimated SIR 40 is calculated for every interval T3, which includes a plurality of slots, and then input to the subtractor 24, FIG. 1. On the other hand, the estimated SIR 42 is calculated for every interval T2, which corresponds to a single slot, and then input to the subtractor 32, FIG. 1.

As shown in FIG. 1, the subtractor 24 subtracts the target SIR from the estimated SIR 40 and feeds the resulting difference to the error decider 26. In response, the error decider 26 produces a result of decision 46 representative of zero when the absolute value of the difference 44 output from the subtractor 44 is smaller than a threshold value or representative of the value of the difference 44 when the former is greater than the latter. The comparison value updater 28 updates the comparison SIR 50 stored in the comparison value holder 30 by subtracting the result of decision 46 or 48 output from the error decider 26. As a result, the comparison SIR decreases when the estimated SIR is greater than the target SIR, increases when the former is smaller than the latter or remains the same when the former has converged to the latter. The resulting comparison SIR 50 is input to the subtractor 32.

The subtractor 32 subtracts the comparison SIR 50 from the estimated SIR 42 output from the SIR estimator 22 and outputs the resulting difference 52. The transmission power of the controlled station 1 is controlled such that the estimated SIR 42 converges to the comparison SIR 50. The control information converter 34 produces power control information 54 that commands the controlled station 1 to lower transmission power if the estimated SIR 42 is greater than the comparison SIR 50 or commands it to raise transmission power if the former is smaller than the latter. The power control information 54 thus produced is sent to the controlled station 1 via the transmitter 36.

In the controlled station 1, the receiver 12 separates the power control information 54 from the signal received from the control station 2 and feeds the information 54 to the transmitter 10. The transmitter 10 selectively raises or lowers transmission power stepwise in accordance with the power control information 54.

As stated above, in the illustrative embodiment, the transmission power of the controlled station 1 is controlled such that the estimated SIR 42 output from the SIR estimator 22 of the control station 2 converges to the comparison SIR held in the comparison value holder 30. Because the estimated SIR 42 has a short mean processing time, the feedback response time of transmission power control is also short enough to prevent transmission power from oscillating. However, the short mean processing time is likely to cause an error to exist in the estimated SIR 42, i.e., cause the estimated SIR 42 to differ from the actual SIR.

In light of the above, in the illustrative embodiment, the SIR estimator 22 calculates the estimated SIR 40 in addition to the estimated SIR 42. The estimated SIR 40 has a longer mean processing time than the estimated SIR 42 and is therefore far closer to the actual SIR than the estimated SIR 42. In the system shown in FIG. 1, the comparison SIR held in the comparison value holder 30 is controlled such that the estimated SIR 40 converges to the target SIR, thereby correcting the error of the estimated SIR 40. This successfully obviates the oscillation of transmission power and allows the SIR of received signals to accurately converge to the target SIR.

In summary, it will be seen that the present invention provides a transmission power control method that controls transmission power in accordance with a difference between an estimated SIR having a short mean processing time and a comparison SIR, thereby reducing the feedback response time of transmission power control and obviating the oscillation of transmission power. Further, the method corrects the error of the above estimated SIR by controlling the comparison SIR in accordance with a difference between another estimated SIR having a long mean processing time and a desired target SIR, thereby allowing the actual SIR of a received signal to accurately converge to the target SIR.

The entire disclosure of Japanese patent application No. 2003-170397 filed on Jun. 16, 2003, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A method of controlling a transmission power of a transmission-power controlled station from a transmission-power control station such that an SIR (Signal-to-Interference Ratio) value of received power of the transmission-power control station converges to a desired target SIR, said method comprising:

a first step of calculating a first estimated SIR having a short mean processing time on a basis of a signal received by said transmission-power control station and a second estimated SIR having a longer mean processing time than the mean processing time to calculate the first estimated SIR, the first step includes a first sub-step of calculating mean powers of said received signals, a second sub-step of calculating a mean value of the mean powers obtained in the first sub-step, a third sub-step of calculating mean powers of desired signal wave components of the received signals, a fourth sub-step of calculating a mean value of said mean powers obtained in the third sub-step, a fifth sub-step of calculating said first estimated SIR on the basis of the mean powers obtained in the first and the third sub-steps, and a sixth sub-step of calculating said second estimated SIR on the basis of the mean values obtained in the second and fourth sub-steps;

a second step of generating power control information for setting said first estimated SIR in a comparison SIR and storing the comparison SIR to thereby control said transmission power such that the first estimated SIR converges to the comparison SIR;

a third step of updating said comparison SIR such that said second estimated SIR converges to a desired target SIR; and a fourth step of controlling the transmission power of the transmission-power controlled station in accordance with said power control information.

* * * * *